United States Patent
Keskkula

(10) Patent No.: US 10,516,571 B2
(45) Date of Patent: *Dec. 24, 2019

(54) SERVER LOAD MANAGEMENT

(71) Applicant: Microsoft Technology Licensing, LLC, Redmond, WA (US)

(72) Inventor: Silver Keskkula, Kuressaare (EE)

(73) Assignee: Microsoft Technology Licensing, LLC, Redmond, WA (US)

( * ) Notice: Subject to any disclaimer, the term of this patent is extended or adjusted under 35 U.S.C. 154(b) by 7 days.

This patent is subject to a terminal disclaimer.

(21) Appl. No.: 15/383,960

(22) Filed: Dec. 19, 2016

(65) Prior Publication Data

US 2017/0104623 A1   Apr. 13, 2017

Related U.S. Application Data

(63) Continuation of application No. 13/739,677, filed on Jan. 11, 2013, now Pat. No. 9,559,906.

(51) Int. Cl.
*G06F 15/177* (2006.01)
*H04L 12/24* (2006.01)
(Continued)

(52) U.S. Cl.
CPC .......... *H04L 41/082* (2013.01); *H04L 41/145* (2013.01); *H04L 43/00* (2013.01);
(Continued)

(58) Field of Classification Search
CPC ..... H04L 41/082; H04L 41/145; H04L 43/00; H04L 43/0829; H04L 43/0894;
(Continued)

(56) References Cited

U.S. PATENT DOCUMENTS 6,411,966 B1    6/2002   Kwan et al.
6,717,915 B1 *  4/2004   Liao ................... H04L 29/06
                                                    370/252

(Continued)

FOREIGN PATENT DOCUMENTS

CN    1794667 A    6/2006
GB    2505924      3/2014

OTHER PUBLICATIONS

"Final Office Action", U.S. Appl. No. 13/739,677, dated Sep. 21, 2015, 24 pages.
(Continued)

*Primary Examiner* — Chirag R Patel
*Assistant Examiner* — Rachel J Hackenberg
(74) *Attorney, Agent, or Firm* — Schwegman Lundberg & Woessner, P.A.

(57) ABSTRACT

System and method for collecting values of one or more parameters of one or more clients that are communicatively connected to a server. A model is constructed based on the collected values of the one or more parameters to thereby model as a function of time the probability that the values of the one or more parameters of the one or more clients will change by an amount that is considered significant, e.g. at the server. An update of the one or more parameters is received from one of the clients. Responsive to receiving the update, the model is used to calculate a timing for the next update of the values from the one of the clients. The calculated timing for the next update is sent to the one of the clients.

20 Claims, 1 Drawing Sheet

(51) Int. Cl.
*H04L 12/26* (2006.01)
*H04L 29/06* (2006.01)
*H04L 29/08* (2006.01)

(52) U.S. Cl.
CPC ...... *H04L 43/0829* (2013.01); *H04L 43/0894* (2013.01); *H04L 43/106* (2013.01); *H04L 63/1408* (2013.01); *H04L 67/12* (2013.01); *H04L 67/22* (2013.01); *H04L 67/2852* (2013.01); *H04L 67/42* (2013.01); *H04L 43/08* (2013.01)

(58) Field of Classification Search
CPC ... H04L 43/106; H04L 63/1408; H04L 67/12; H04L 67/22; H04L 67/2852; H04L 67/42
See application file for complete search history.

(56) References Cited

U.S. PATENT DOCUMENTS

| | | | |
|---|---|---|---|
| 6,996,627 | B1 | 2/2006 | Carden |
| 7,441,011 | B2 | 10/2008 | Lin et al. |
| 7,606,895 | B1 * | 10/2009 | Dini .................. H04L 12/14 709/223 |
| 8,914,793 | B2 | 12/2014 | Cheng et al. |
| 9,559,906 | B2 | 1/2017 | Keskkula |
| 2002/0143911 | A1 | 10/2002 | Vicente et al. |
| 2006/0294055 | A1 | 12/2006 | Santosuosso |
| 2008/0240156 | A1 | 10/2008 | Elliot et al. |
| 2008/0281965 | A1 | 11/2008 | Zhong et al. |
| 2009/0204348 | A1 | 8/2009 | Davis et al. |
| 2010/0325263 | A1 | 12/2010 | Raja et al. |
| 2011/0295983 | A1 | 12/2011 | Medved et al. |
| 2013/0124718 | A1 | 5/2013 | Griffith et al. |
| 2013/0301415 | A1 | 11/2013 | Archer et al. |
| 2013/0336111 | A1 | 12/2013 | Vos et al. |
| 2014/0153419 | A1 * | 6/2014 | Beattie, Jr. ............ H04W 24/10 370/252 |
| 2014/0181266 | A1 | 6/2014 | Joch et al. |
| 2014/0201343 | A1 | 7/2014 | Keskkula |
| 2014/0297794 | A1 * | 10/2014 | Staurnes ........... H04L 29/12471 709/217 |

OTHER PUBLICATIONS

"Foreign Office Action", EP Application No. 14703959.8, dated Jun. 21, 2016, 5 pages.
"International Search Report and Written Opinion", Application No. PCT/US2014/011172, dated Apr. 11, 2014, 12 Pages.
"Non-Final Office Action", U.S. Appl. No. 13/739,677, dated Mar. 22, 2016, 38 pages.
"Non-Final Office Action", U.S. Appl. No. 13/739,677, dated Apr. 3, 2015, 26 pages.
"Non-Final Office Action", U.S. Appl. No. 13/739,677, dated Dec. 1, 2014, 11 pages.
"Notice of Allowance", U.S. Appl. No. 13/739,677, dated Sep. 15, 2016, 15 pages.
"Update Abuse Policy", Retrieved from <http://dyn.com/support/abuse/> on Sep. 6, 2012, Sep. 2012, 2 pages.
Dilman,"Efficient Reactive Monitoring", Proceedings IEEE Infocom 2001. Conference on Computer Communications. vol. 2, Apr. 22, 2001 (Apr. 22, 2001), pp. 1012-1019, Apr. 22, 2001, 8 Pages.
"International Preliminary Report on Patentability Issued in PCT Application No. PCT/US2014/011172", dated Mar. 20, 2015, 8 Pages.
"Second Written Opinion Issued in PCT Application No. PCT/US2014/011172", dated Dec. 22, 2014, 7 Pages.
"First Office Action and Search Report Issued in Chinese Patent Application No. 201480004558.5", dated Nov. 30, 2017, 11 Pages.
"Office Action Issued in Chinese Patent Application No. 201480004558.5", dated Nov. 27, 2018, 5 Pages.
"Second Office Action Issued in Chinese Patent Application No. 201480004558.5", dated Aug. 16, 2018, 5 Pages.

* cited by examiner

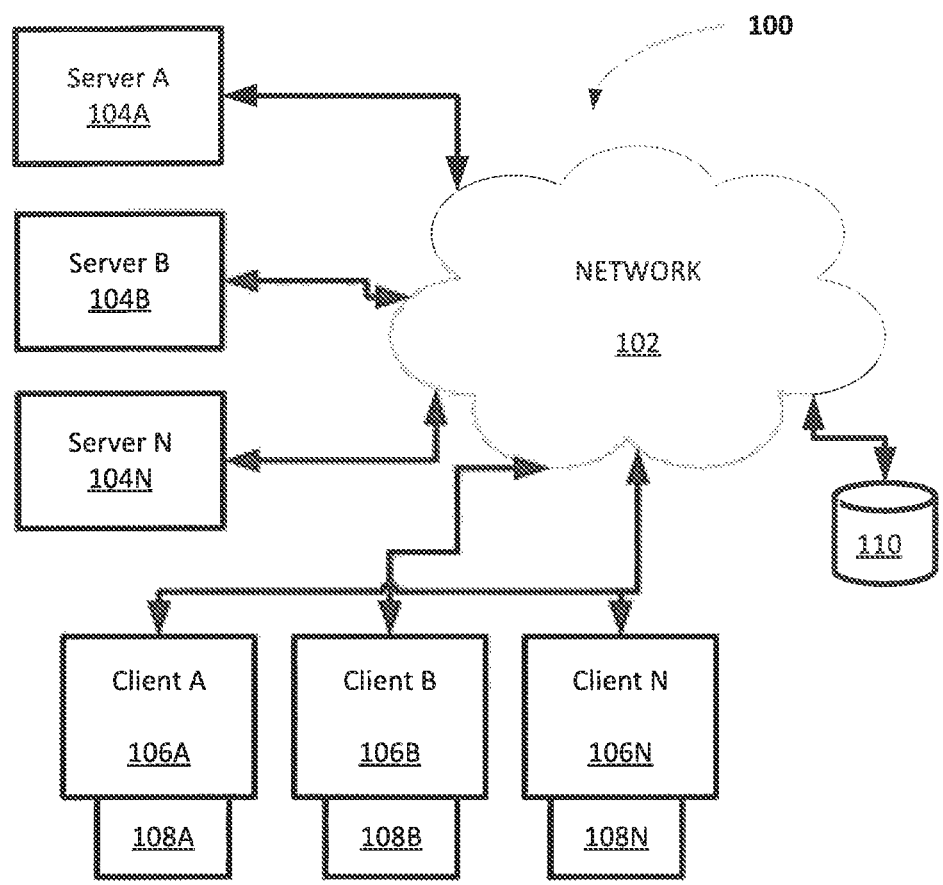

SERVER LOAD MANAGEMENT

RELATED APPLICATIONS

This application is a continuation of U.S. patent application Ser. No. 13/739,677, entitled "Server Load Management" and filed Jan. 11, 2013, the disclosure of which is hereby incorporated by reference herein in its entirety.

BACKGROUND

With computing becoming mainstream and essential for running any business or service, a large number of servers are being employed for different types of services (e.g., banking, customer service, human resource management, etc.). Typically, a server is customized to provide a particular type of service. For example, in a banking application, one or more servers are hosted by a bank and bank's customers, partners and associates connect to these servers to perform banking tasks. In the Internet based applications, the customers typically use Internet browsers to connect to one or more servers. However, dedicated client applications are also often used for specific type of applications. For example, millions of Skype™ client applications connect to servers for authentication, finding information, sending information to be routed to other clients, etc.

Typically, in order to serve a large number of users, more servers are added at the backend, and typically, load balancing systems are used to spread the load across multiple back-end servers.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In client-server applications, a server may find it useful to have data regarding the state of the clients which are connected to it. For example, the server may make routing decisions for traffic through a network based on the state of the clients. However, the states of the clients may vary over time. Therefore, a client might often need to update its status to the server or call server to perform a service upon the occurrence of an event as for example, if a server is collecting continuously changing data values from one or more clients. Such updating can be done by sending updates from the client when a property value changes. However, in this mechanism, the server has no control over volume of traffic generated. The client may also update a server by sending regular updates to server. In this method, even though the traffic is more predictable, the server capacity needs to be set high requiring higher than needed reservation of computing power because updates will be sent according to the regular timing even when no update is necessary (e.g. because no change in state has occurred for the client since the previous update). This problem increases as the number of clients in the system increases. For example, there may be of the order of tens of millions of clients.

The embodiments described herein disclose the client sending updates to a server and in response the server providing a timing at which the next update should be sent. In this way, the server can control the timings of the updates from the clients, e.g. on a client by client basis.

Data can be collected about client side changes to the values of the parameters of the client, and the collected data can be analyzed to build models for modeling, as a function of time, the probability that the values of the parameters of the clients will change by an amount that is considered significant by the server (based on history). Changes are considered significant, e.g. at the server if they would affect decisions that the server will make. For example, if the bandwidth available to a client changes by an amount which would affect routing decisions made by the server (e.g. to avoid the client) then that change would be considered significant by the server. The models may be used after one or more calls from the client to calculate the most efficient call-back time for the next update for a particular client. For example, based on a model, a server determines that the value of a parameter of a client does not tend to deviate beyond a preselected range within a particular time interval, so the server may instruct the client to adopt a timing for the next update of the parameter values to be larger than the particular time interval. With a popular application and versatile user behaviors that influence client statuses the savings on the server-side (due to reduced traffic) can be substantial. In one embodiment, an application programming interface (API) is provided to query the model. The API may be encapsulated in a service that can be used by local or remote clients.

In one embodiment, a method for collecting, values of one or more parameters of one or more clients that are communicatively connected to a server is disclosed. A model is constructed based on the collected values of the one or more parameters to thereby model as a function of time the probability that the values of the one or more parameters of the one or more clients will change by an amount that is considered significant, e.g. at the server. An update is received from one of the clients, the update being an update of the values of the one or more parameters of said one of the clients. Responsive to receiving said update, the model is used to calculate a timing for the next update of the values from said one of the clients, and the calculated timing for the next update is sent to said one of the clients.

In yet another embodiment, a system, comprising a server and a client that is communicatively connected to the server is disclosed. The client is configured to send, to the server, an update of values of one or more parameters of the client. The server is configured to: (i) responsive to receiving said update, use a model to calculate a timing for the next update of the values from the client, wherein the model is constructed based on the values of the one or more parameters to thereby model as a function of time the probability that the values of the one or more parameters of the client will change by an amount that is considered significant (e.g. at the server), and (ii) send the calculated timing for the next update to the client.

In yet another embodiment, a computer program product comprising program code stored in a computer readable storage medium is disclosed. The program code is executable by a processor of a server to implement the operations of: collecting values of one or more parameters of one or more clients that are communicatively connected to the server; constructing a model based on the collected values of the one or more parameters to thereby model as a function of time the probability that the values of the one or more parameters of the one or more clients will change by an amount that is considered significant (e.g. at the server); receiving, from one of the clients, an update of the values of the one or more parameters of said one of the clients; responsive to receiving said update, using the model to calculate a timing for the next update of the values from said one of the clients; and sending the calculated timing for the next update to said one of the clients.

Other embodiments include, without limitation, a tangible computer-readable storage medium, such as one or more storage memories, that include instructions that enable a processing unit to implement one or more aspects of the disclosed methods as well as a system configured to implement one or more aspects of the disclosed methods.

BRIEF DESCRIPTION OF THE DRAWINGS

So that the manner in which the above recited features of the described embodiments can be understood in detail, a more particular description of the embodiments, briefly summarized above, may be had by reference to embodiments, some of which are illustrated in the appended drawings. It is to be noted, however, that the appended drawings illustrate only typical embodiments and are therefore not to be considered limiting of the claim scope, for the described subject matter may admit to other equally effective embodiments.

FIG. 1 illustrates a schematic of a load and property change modeling system, according to one embodiment.

DETAILED DESCRIPTION

In the following description, numerous specific details are set forth to provide a more thorough understanding of the described embodiments. However, it will be apparent to one of skill in the art that the claimed subject matter may be practiced without one or more of these specific details. In other instances, well-known features have not been described in order to avoid obscuring the various embodiments.

Reference throughout this disclosure to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

FIG. 1 illustrates an exemplary system 100 for server load and characteristics change modeling. Accordingly, the system 100 includes one or more servers 104A . . . 104N and a plurality of clients 106A . . . 106N. The clients 106A . . . 106N are communicatively connected to the one or more servers 104A . . . 104N via a network 102. The network 102 may be the Internet or a local area network. One or more clients 106A . . . 106N may use wireless networking to connect to the network 102. There may be of the order of tens of millions of clients, but only three clients are shown in FIG. 1 for clarity.

In one example, the client 106A has a number of parameters that describe its current state (e.g., the user activity on the application or properties that are a function of user interactions with the application). The parameters may include one or more of: (i) current bandwidth, (ii) historic packet loss rate, (iii) an address of the client, (iv) a processing power, (v) a connection type (e.g. via Wi-Fi access point or via a cellular network) of the client to a network, with which the client is currently operating, (vi) cpu consumption, (vii) amount of cross traffic and (viii) number of relayed streams. It should be noted that parameters other than those given by way of example herein may be used in the methods described herein. The parameters used may depend upon the application in question and the problem the application is trying to solve.

The client 106A may also be monitoring a particular type of event and may be updating changes in data pertaining to the event to one or more servers 104A . . . 104N. In one embodiment, each of the servers 104A . . . 104N may be a single computer or may be a computing system comprising a plurality of computers. The plurality of computers may include a system for gathering parameter value updates from one or more clients 106A . . . 106N and building a model of the gathered parameter values. In one example, an Application Programming Interface may be provided to enable one or more servers 104A . . . 104N or external systems to access the model.

In some cases, for example in Peer-to-Peer applications (such as Skype™) the resources available at a node could be consumed by other users and influence the current nodes properties (or "parameters") despite the inactivity of the user associated with the client 106A. In some cases, this state of properties may be required on the server side and the user experience may suffer from a mismatch between the state in clients and on the servers.

In one embodiment the client 106A can send updated parameter values to the server 104A when the properties change. If clients send updates to the server 104A every time a monitored parameter value changes, there would be little control over the load on servers and further, at times, the servers 104A . . . 104N could be flooded by updates with property changes that may not be required by the server 104A.

In another embodiment, the client 106A could send updates at regular intervals (e.g., every 2 minutes). Such updates at a preselected regular interval puts a constant and predictable load on the servers A104A . . . N. In Web based applications, different update intervals can easily be selected by the clients 106A . . . N simply by changing a property of client side code residing at the server. Every time a web application is initiated, the client (browser) retrieves the code from the server. The code could contain the property such that the client retrieves the property including any changes that have been made to it. In this way, there is an opportunity to change the client side logic for a web application every time a webpage is loaded. However, in case of a non-web application (e.g., Skype™ client or a native client) it is difficult to change the update interval without downloading an update to the application or installing a new version of the application at the clients 106A . . . N. This shortcoming can be addressed by some means of dynamic configuration or adding an update interval time into the response container sent to the client and modifying the client behavior to use the server set update interval instead.

The code described herein can be embodied on any suitable type of computer readable storage medium, such as computer memories and the like. The term "computer readable storage medium" is intended to cover statutory forms of computer readable media. As such, the term "computer readable storage medium" is not intended to cover non-statutory forms of media, such as carrier waves and signals per se.

Such adaptability can further be personalized for each user or client, by modifying the client 104A to provide information about parameter value changes with each request or call to the server. With servers that operate according to a stateful protocol, this allows reconstructing a time-series of parameter value changes for each user, allowing models to be built that can be used to determine parameter value update intervals based on a probability that the parameter values will have changed significantly within the update interval. A server that operates according to a stateful protocol is aware of the client side state. In one example, a server is aware of previous updates of a particular parameter value at a client. A server may employ a local (including in memory storage) or remote data storage to store successive updates from one or more clients. In another example, with cloud servers operating according to a stateless protocol, the clients 106A . . . 106N can provide statistics about client side changes or historical data with each update, that would enable the server to determine the behavior of changes in the parameter values without querying data from other servers. In other words, in case of a server operating according to a stateless protocol, the clients 106A . . . 106N may provide sufficient information to the server 104A with each call or request in such manner that alleviate a need for the server to know the previous states pertaining to the parameter values being updated at the server by clients.

As an example for a native application implemented at a user device, where for example 10% of the users experience client side changes to their parameter values often enough to require an update to the servers once every minute, while the majority of the users or clients require the same update on average once every 5 minutes, the unnecessary load on servers with a naïve approach where each client would send an update every minute (to meet the needs of a minority) would be substantial. The ability to determine appropriate timings for the updates to the parameter values for each client would enable a substantial saving of resources on the server side as well as the communication bandwidth. In one embodiment, the benefits are further amplified by bringing the logic on the server side, which enables changing the logic of what changes to the parameter values influence update decisions without knowing them at design time.

Further, in a system that includes a network of sensors, for example, in a manufacturing factory environment, the system and methods described herein may be employed to optimize value update frequencies among sensors and data collection modules.

The system 100 may include a datastore 110 for storing at least a part of data received from the clients 106A . . . 106N. The stored data may include changes to the parameter values received from one or more clients 106A . . . 106N. The datastore 110 may also store models to thereby model as a function of time the probability that the values of the parameters of the clients will change by an amount that is considered significant by the server. The datastore 110 may be an in-memory or persistent data storage on a storage server, which may be independent of the servers 104A . . . 104N or may be a part of one or more servers 104A . . . N.

In another embodiment, a composite model may be created based on a plurality of property values. That is, instead of making determinations based on the changes in one parameter value, a weighted average of changes in a plurality of property values may be used to adjust the timing of the next update of the parameter values for a particular client. Each parameter value in a composite model may be assigned a weight and an average deviation is calculated according to parameter value deviations. Hence, wide changes in a parameter value with low weight may affect the outcome less than relatively smaller changes in another property value with high weight. In another example, there can be nonlinear models and complex interactions between the parameters where a big change in one parameter alone doesn't constitute a change that would be considered significant by the server, but together with a small change in some other specific parameter has a huge impact on the output, and is considered significant by the server, and therefore worthy of scheduling an update from the client sooner.

In another embodiment, instead of calculating mean or average deviations, or in conjunction of calculating mean or average deviations, a classifier model may be employed to output, for example, 0 or 1 if a parameter value is going to change enough to require a change in update frequencies.

As a broad overview, a client 106A sends an update of its parameter values to a server 104A. In response, the server 104A will determine a timing at which it would like the next update of the parameter values from the client 106A. This timing is determined using the model described above, which is maintained on the network 102 (e.g. at the server 104A itself or at another node of the network 102). The received parameter values are input into the model and the model outputs the timing for the next update to the parameter values. The model may calculate the timing based on the history of the changes to the parameter values for the client 106A and/or other clients in the network. The model may consider one parameter, or a combination of more than one of the parameters, in order to model the probability that the values of the one or more parameters of the one or more clients will change by an amount that is considered significant, e.g. at the server. As described above, a change is considered significant by the server, if it will affect decisions (e.g. routing decisions) that the server may make. We refer herein to a change being considered significant "by the server". More precisely, the significance is actually a decision or calculation of the domain expert, or operator of the server. For example, an operator can decide (based on data) that a 20 ms increase in a round-trip-time parameter is to be considered significant enough to indicate that the resource usage is changing on the client to an extent such that the next update should be scheduled sooner than it would otherwise be scheduled. The domain expert, or operator may provide a set of rules by which the server can determine whether changes are to be considered significant, and thereby worthy of a change to the scheduling of updates. The server can then use the set of rules with historic data to determine the timing at which the updates of the parameters values are sent to the server from each client, such that the updates are sent to the server at timings which are based on the probability that the values of the parameters will change significantly between updates. The timing of the next update may take the form of a time delay (or "time interval") indicating a time that the client 106A should wait after receiving the timing before sending the next update of the parameter values. Alternatively, the timing of the next update may take the form of a timestamp indicating an absolute time at which the client 106A should send the next update of the parameter values.

The calculated timing is sent from the server 104A to the client 106A in a response container that is sent back to the client 106A in response to the server 104A receiving the update from the client 106A. The client 106A is configured to send the next update of the parameter values according to the calculated timing.

At least some clients 106A . . . 106N may include local data collection modules 108A . . . 108N. A local data collection module 108A is configured to collect performance and/or parameter change data related to the client 106A. In one example, the collected data may include one or more of inactivity time, processor usage, network usage, computer game score change, number of times in a selected period of time the client 106A connects to one or more servers 104A . . . 104N, etc.

The client 106A may be a mobile device, a laptop, a desktop or any computing system that is capable of connecting to the network 102 and execute software applications (e.g., an Internet browser or a native application). The server 104A may operate according to a stateful or a stateless protocol. In case of a server operating a stateful protocol, the server 104A includes the functionality to store at least a part of the incoming data from the clients 106A . . . 106N. For example, if the client 106A sends a request to the server 104A, the server 104A is aware of previous requests from the same client 106A. In one embodiment, either a local database associated with the server 104A or the datastore 110 is used by the server 104A to store at least a part of data from the clients 106A . . . 106N.

In case of if the servers 104A . . . 104N operate according to a stateless protocol, that is, these servers remain unaware of a previous value of a parameter provided by the clients 106A . . . 106N with requests. In such cases, the client 106A uses the data collection module 108A to collect changes to the parameter values in the client 106A and the consolidated or summarized data pertaining to changes to the parameter values is sent to the server 104A (or any other server in a group) with the requests to the server 104A. The summaries of parameter value changes received from clients 106A . . . 106N may be stored in the datastore 110.

The data relating to the changes in the parameter values associated with the clients 106A . . . 106N may be used to calculate average or mean deviations of the parameter values in predefined time intervals, which then can be used to increase or reduce the time intervals between updates sent from the clients 106A . . . 106N to the servers 104A . . . 104N. The models may be determined based on the usefulness of information that the client tends to report in the updates from the clients 106A . . . 106N to the servers 104A . . . 104N (determined based on the historic data collected for the previous updates). In one embodiment, the models may be used by network administrators (or server management systems including methods for automated provisioning of virtual servers) to determine how many servers would be needed to serve the request load from clients. This is also useful to reserve on-demand computing power, particularly in a cloud computing environment in which the computing power is sold based on the actual usage per minute or per hour (e.g., the computing power time based renting model).

In client-server applications, a client might often need to update the status of a client side property to the server. This updating can be done either by sending updates from the client when a status change occurs or by sending regular updates from the client to the server. In one example, influential client side property changes are added to the request container and a delay before the next update is indicated in the response container. Such changes enable the server to have full control over the timings of client updates and also allow optimization of the update timings for each client 106A . . . 106N. That is, the timings are determined on a client-by-client basis. This is particularly useful in large scale system where there may be tens of millions of clients, since the server can limit the update timings of the clients such that it receives updates at timings for each client that are based on the probability of significant changes to the parameters values occurring for each client. The call back time or the update timing is calculated based on a statistical analysis of previous changes to parameter values over time and other specific characteristics of a particular parameter.

The data collected about client side parameter value changes can be analyzed to build models (e.g. offline models) to calculate the most efficient call-back time for a particular client. With a popular application and versatile user behaviors that influence client statuses the savings of computing power on the server-side (due to reduced and controlled traffic) can be substantial, especially in cloud computing environments where the computing power is rented on hourly basis.

In one embodiment, the client update timing is determined based on a naive Bayes classifier that, in one example, classifies the current client into a group that exhibits similar behavior and benefits from a different callback time than other groups. A naïve Bayes classifier is a simple probabilistic classifier based on applying Bayes' theorem with strong (naive) independence assumptions.

As described above, the server 104A may store data relating to changes in parameter values received from various clients 106A . . . N in the datastore 110. Subsequently, based on the collected data and using well known statistical methods and/or machine learning algorithms, the server 104A (alternatively, a dedicated machine for training the model) trains a model, wherein the model is used to produce an output which attempts to predict influential changes or the probability of influential changes, e.g. by calculating the expected rate of changes in the parameter values.

In one embodiment, types of requests sent to the servers 104A . . . N may also be recorded and based on the collected data, average load pattern model can be built for the group of servers 104A . . . N and expected load may be calculated using one or more well-known statistical methods. Having a load model would be advantageous for provisioning or de-provisioning servers on demand (e.g., spawning more virtual machines or shutting down some virtual machines on demand at different times according to the calculated load model.

Although the various embodiments have been described in language specific to structural features and/or methodological acts, it is to be understood that the embodiments defined in the appended claims are not necessarily limited to the specific features or acts described. Rather, the specific features and acts are disclosed as example forms of implementing the various claimed embodiments.

The invention claimed is:

1. A method implemented by a client computing device, the method comprising:

sending, to a server, a call or request, the call or request including first values from the client computing device of one or more parameters of the client computing device measured during a first time period;

the call or request further including second values of the one or more parameters of the client computing device measured during a second time period previous to the first time period;

receiving from the server an indication of an update time to send a next update, the update time calculated by the server using a model that models, as a function of time, a probability that the first values of the one or more parameters of the client computing device will change by a threshold amount, based at least in part, on the second values; and sending the next update including third values of the one or more parameters of the client computing device measured during a third time period consistent with the update time to the server at the indicated update time.

2. The method of claim 1, further comprising sending by the client computing device to the server historical data with the call or request, wherein the server determines the probability based on the historical data.

3. The method of claim 1, wherein the update time is calculated by the server using a history of changes to the one or more parameters in the model included with the call or request.

4. The method of claim 1, wherein the call or request includes information describing user activity on an application of the client device, and wherein the server determines the probability based on the information.

5. The method of claim 1, wherein said parameters include one or more of: (i) bandwidth usage during the first time period, (ii) historic packet loss rate, (iii) an address of the client device, (iv) a processing power, (v) a connection type of the client device to a network, (vi) CPU consumption, (vii) amount of cross traffic and (viii) number of relayed streams.

6. The method of claim 1, wherein the probability that the values of the one or more parameters of the client device will change by the threshold amount is based on a plurality of said parameters.

7. The method of claim 1, wherein each of the parameters of the one or more parameters is assigned a weight, and wherein the model uses the weights of each of the parameters of the one or more parameters to calculate the update time.

8. A client computing device comprising:
a hardware processor; and
a computer readable storage medium storing program code, the program code being executable by the hardware processor to implement operations comprising:
sending, to a server, a call or request, the call or request including first values from the client computing device of one or more parameters of the client computing device measured during a first time period,
the call or request further including second values of the one or more parameters of the client computing device measured during a second time period previous to the first time period;
receiving from the server an indication of an update time to send a next update, the update time calculated by the server using a model that models, as a function of time, a probability that the first values of the one or more parameters of the client computing device will change by a threshold amount, based at least in part, on the second values; and
sending the next update including third values of the one or more parameters of the client computing device measured during a third time period consistent with the update time to the server at the indicated update time.

9. A client computing device as recited in claim 8, the operations further comprising sending by the client computing device to the server historical data with the call or request, wherein the server determines the probability based on the historical data.

10. A client computing device as recited in claim 8, wherein the update time is calculated by the server using a history of changes to the one or more parameters in the model included with the call or request.

11. A client computing device as recited in claim 8, wherein the model calculates the update time based on a history of changes to the one or more parameters values for the client computing device.

12. A client computing device as recited in claim 8, wherein said parameters include one or more of: (i) bandwidth usage during the first time period, (ii) historic packet loss rate, (iii) an address of the client device, (iv) a processing power, (v) a connection type of the client device to a network, (vi) CPU consumption, (vii) amount of cross traffic and (viii) number of relayed streams.

13. A client computing device as recited in claim 8, wherein the model receives a combination of more than one of said parameters in order to model the probability that the values of the one or more parameters of the client device will change by the threshold amount.

14. A client computing device as recited in claim 8, wherein each of the parameters of the one or more parameters is assigned a weight, and wherein the model uses the weights of each of the parameters of the one or more parameters to calculate the update time.

15. A client computing device as recited in claim 8, wherein said indication of the update time is either: (i) a time delay indicating a time that the client computing device should wait after receiving the timing before sending the next update, or (ii) a timestamp indicating an absolute time at which the client computing device should send the next update.

16. A system comprising:
a client computing device comprising one or more hardware processors, the one or more hardware processors configured to execute program code to communicate with a server that is communicatively connected to the client computing device and perform operations comprising:
sending, to a server, a call or request, the call or request including first values from the client computing device of one or more parameters of the client computing device measured during a first time period,
the call or request further including second values of the one or more parameters of the client computing device measured during a second time period previous to the first time period;
receiving from the server an indication of an update time to send a next update, the update time calculated by the server using a model that models, as a function of time, a probability that the values of the one or more parameters of the client computing device will change by a threshold amount; and
sending the next update including third values of the one or more parameters of the client computing device measured during a third time period consistent with the update time to the server at the indicated update time.

17. The system of claim 16, wherein the one or more parameters include data relating to one or more of inactivity time of the client computing device, processor usage of the client computing device, network usage of the client computing device, a computer game score change, or a number of times in a selected period of time the client computing device connects to one or more servers.

18. The system of claim 16, wherein the model receives a combination of more than one of said parameters in order to model the probability that the values of the one or more parameters of the client device will change by the threshold amount.

19. The system of claim 16, wherein each of the parameters of the one or more parameters is assigned a weight, and wherein the model uses the weights of each of the parameters of the one or more parameters to calculate the timing.

20. The system of claim 16, wherein said indication of the update time is either: (i) a time delay indicating a time that the client computing device should wait after receiving the timing before sending the next update, or (ii) a timestamp indicating an absolute time at which the client computing device should send the next update.

* * * * *